United States Patent [19]

Schumacher et al.

[11] 4,354,362
[45] Oct. 19, 1982

[54] INTEGRAL SUCTION LINE ACCUMULATOR/FILTER-DRIER

[75] Inventors: Ernest W. Schumacher, DeSoto, Tex.; Stephen E. Evans, Ellicott City, Md.

[73] Assignee: Virginia Chemicals, Inc., Portsmouth, Va.

[21] Appl. No.: 204,807

[22] Filed: Nov. 7, 1980

[51] Int. Cl.³ .............................................. F25B 43/00
[52] U.S. Cl. ...................................... 62/474; 62/503; 210/DIG. 6
[58] Field of Search ........................ 62/474, 475, 503; 210/DIG. 6

[56] References Cited

U.S. PATENT DOCUMENTS

| 2,504,184 | 4/1950 | Dawson | 62/503 |
| 2,548,335 | 4/1951 | Balogh | 62/503 |
| 3,118,288 | 1/1964 | Small | 62/294 |
| 3,212,289 | 10/1965 | Bottum | 62/513 |
| 3,572,050 | 3/1971 | Bottum | 62/475 |
| 3,759,062 | 9/1973 | Wrenn et al. | 62/474 |
| 3,785,164 | 1/1974 | Wrenn et al. | 62/474 |
| 3,798,921 | 3/1974 | Scherer et al. | 62/503 |
| 3,824,802 | 7/1974 | Scherer et al. | 62/474 |
| 4,100,762 | 7/1978 | Davis et al. | 62/503 |
| 4,199,960 | 4/1980 | Adams et al. | 62/503 |

Primary Examiner—Ronald C. Capossela
Attorney, Agent, or Firm—Depaoli & O'Brien

[57] ABSTRACT

An integral low-pressure accumulator/filter-drier for use in air conditioning and refrigeration systems between the evaporator and the compressor is described. This device is installed in upright position and includes a filter-drier and an accumulator which are separated by a bottom filter-drier retaining member which positions, in cooperation with a top filter-drier retaining member, an annular filter-drier assembly comprising a pair of thin cylindrical filter cartridges which straddle an annular dessicant bed which is itself straddled, at top and bottom, by a pair of annular filter pads. A pickup tube within the accumulator is sealably attached to an opening within the bottom retainer plate and extends coaxially within the inner filter cartridge, being biased against the top retainer plate by a spring assembly so that it is securely held and resistant to vibrations and rotation thereof. While the in-flowing mixture of refrigerant and oil is passing through the dessicant bed, the liquid separates from the vapor and flows downwardly into the plenum chamber of the accumulator. Porosity relationships within the filter-drier assembly direct a minor portion, such as 15%, of the vapor into the accumulator for picking up the liquid through a bottom orifice in the pickup tube.

34 Claims, 10 Drawing Figures

INTEGRAL SUCTION LINE ACCUMULATOR/FILTER-DRIER

BACKGROUND OF THE INVENTION

1. Field of the Invention

This invention relates to accumulators used in the suction line between the evaporator and the compressor in a refrigeration or air conditioning system and also relates to filter-driers which are used in such systems for filtering and dehydrating the refrigerant and oil in their liquid and vapor states.

2. Review of the Prior Art

In air conditioning, refrigerating, heat pump, and hot gas defrost systems of the prior art, filters and driers are essential components for removing harmful contaminants and protecting the motor compressor, the heart of any such system, which is called upon today to withstand increasingly severe operational conditions because market conditions are requiring smaller and more compact systems and higher speed compressors which subject the unit to higher temperatures and pressures and tend to shorten its life and increase the danger of premature breakdown.

Because the electrical portion of the motor is in direct contact with the refrigeration circuit, the chemical environment to which it is exposed is of prime importance. In addition, it is subject to damage from solids which must be prevented from reaching the compressor. These materials, in spite of utmost care in assembling and cleaning out a system, seem to be always present and are frequently not dislodged until the system is initially started up. They are major contributors to hermetic motor burn-outs and are also the cause of mechanical damage to close-tolerance parts by abrasive action.

At the present time, a system sanitizing approach is used to isolate the motor compressor from three general categories of contaminants which play important roles in compressor failure. These are: (1) harmful soluble chemicals; (2) damaging liquids and solids; and (3) oxygen present in air as a non-condensible.

Liquid line filter-driers are used to remove the broad spectrum of soluble contaminants, which include water, acids, oil breakdown products, tars, resins, gums, and dirt of relatively large particle size. The resins and gums are absorbed, and the dirt is filtered out. Such receiver driers are described in U.S. Pat. No. 3,118,288 and U.S. Pat. No. 3,785,164. They generally include a dessicant such as a molecular sieve or alumina and a flow directing means for forcing the liquid to pass through the dessicant.

However, vapor-phase filters having very little pressure drop are being increasingly used in recent years. Such vapor-phase filters are designed to remove harmful particles too small for filter-driers to take out in the liquid line, in addition to materials which are present in the system beyond the point where the liquid line filter-drier is installed.

Used in conjunction with a liquid line filter-drier, a vapor-phase filter effectively isolates the motor compressor from finely divided steel and other metallic particles which are believed to be the major cause of motor burn-outs when carried to the windings by high-velocity suction gas. These offending particles include metal chips, solder flux, copper oxide, iron rust, carbon, corrosion solids, and the like which contribute to motor burn-out or cause compressor damage through abrasion. However, a suction-side filter will filter out gross quantities of the foreign materials as small as 5 microns (0.0002 inch) in diameter, with negligible pressure drop while permitting high rates of gas flow in the suction line. Such vapor-phase filters are necessarily large in volume as compared to liquid line filter-driers.

Compressor damage is also caused by slugging of refrigerant and oil which typically occurs when a refrigeration or air conditioning system has been idle for an extended period. The suction effect of the compressor, when starting up after such idleness, creates such a low pressure that both liquid and vapor are pulled out of the evaporator and reach the compressor unless a means is provided for separating the liquid from the vapor and accumulating the liquid until it can be gradually re-introduced into the system as needed in the form of harmless droplets mixed with the vapor.

Excessive quantities of liquid refrigerant dilute the oil, wash out bearings, and in some cases cause complete loss of oil in the crankcase of the compressor because of the high solubility of the oil in the refrigerant. Because compressors are designed to compress vapors, not liquids, such accumulations or "slugs" also can result in broken valve reeds, pistons, rods, crank shafts, and the like parts of a compressor.

Thus a storage component in the form of an uprightly disposed cylinder is commonly added to the suction side of the refrigeration or air conditioning system to act as a reservoir for temporarily holding the excess oil-refrigerant mixture and returning it at a rate that the compressor can safely handle. Such an accumulator usually can hold from about one-half to about two-thirds of the oil-refrigerant mixture that is within the system.

In such accumulators, the total vapor and liquid-oil refrigerant mixture must flow through the accumulator which generally comprises a deep plenum chamber and a J-shaped pickup tube. This tube has an inlet which is disposed high above the bottom of the chamber to receive vapor but not liquid entering the chamber through the inlet port, and one or more orifices near the bottom bend of the pickup tube for gradually picking up liquid, including portions of the oil layer, by entrainment in the vapor flow passing through the bottom bend, enroute to the compressor.

Various suction accumulators have been designed with baffling and flow directing devices for gradual pickup of liquid by a flowing stream of vapor and for storing sudden surges of liquid refrigerant within the plenum chamber. U.S. Pat. Nos. 3,488,678; 3,698,207; 3,754,409; 3,796,064; and 3,938,353 are examples of such prior art devices. Their designs have sought to minimize inherent low efficiency with respect to pressure drop through the devices because pressure drop in the suction line of a refrigeration or air conditioning system adversely affects the total system capacity and the cost of operation. Another design objective has been to return in a gradual way a portion of the accumulated liquid refrigerant and the vapor as entrained mist or droplets of such minimal size as to be incapable of damaging the compressor.

In view of the limited space that is available adjacent to modern engines and refrigeration and air conditioning systems, both stationary and mobile, and the need for both filtering and liquid accumulation, it is highly desirable to be able to combine the functions and the space requirements of an accumulator and a filter and additionally highly desirable to be able to include the protective function of vapor-state drying within the same device.

SUMMARY OF THE INVENTION

It is therefore an object of the invention to provide a device, for installation on the suction side of an air conditioning or refrigeration system, which is capable of filtering all fluids moving toward the compressor.

It is also an object to provide within this device a means for drying all of these fluids.

It is another object to provide within this device a means for separating the liquid from the vapor in these fluids.

It is further an object to provide a means for directing the separated liquid to an accumulator plenum chamber within this device.

It is additionally an object to provide a means for directing a minor portion of the separated vapor into the accumulator plenum chamber.

It is still further an object to provide a means for gradually picking up the separated liquid with the minor portion of the vapor and returning both streams to the compressor without damage thereto and in combination with the major portion of the separated vapor.

In accordance with the principles of this invention, a low-pressure accumulator/filter-drier is herein provided that is installed in upright position between an evaporator and a compressor of an air conditioning or refrigerating system and which comprises in sealed combination within an enclosing shell:

A. a filter-drier which comprises:

(1) a first retainer means for sealably separating the filter-drier from the accumulator which is disposed therebeneath, (2) a second retainer means for separating the filter-drier into an inlet plenum chamber and a discharge plenum chamber, the inlet plenum chamber being connected to the evaporator for receiving liquid and vapor therefrom and the discharge plenum chamber being connected to the compressor, and (3) a filtering and drying means for:

(a) drying the liquid and the vapor, (b) separating the liquid from the vapor, (c) at steady-state conditions, directing substantially all of the liquid and a minor portion of the vapor to the accumulator through at least one opening in the first retainer means, and (d) directing the remainder of the vapor to the discharge plenum chamber through an opening in the second retainer means; and B. The accumulator, having:

(1) a storage means for storing the separated liquid received from the filtering and drying means, and (2) a pickup means for venting the minor portion of the vapor from the storage means, for picking up the liquid with this minor portion under steady-state conditions, and for transmitting the minor portion of the vapor and the liquid to the discharge plenum chamber and thence to the compressor without damage thereto.

This accumulator/filter-drier is uprightly disposed when in use and essentially comprises a filter-drier which is above and sealably separated from an accumulator. The filter-drier is divided into an inlet plenum chamber and a discharge plenum chamber. Within the inlet plenum chamber, a filter-drier assembly is off-centeredly disposed. It comprises a pair of cylindrical filter cartridges which are longitudinally disposed and are spaced apart by an annular dessicant bed, the filter cartridges being held in place by bottom and top filter retainers which function as positioning means therefor. Each filter retainer has an opening which is coaxially disposed with the filter assembly and through which a J-tube passes. The J-tube is sealably connected to the bottom filter retainer and also biased and non-rotatably positioned against the bottom filter retainer which also separates the filter-drier and the accumulator. The upper filter retainer separates the inlet plenum chamber from the discharge plenum chamber. A pair of annularly shaped filter pads are radially disposed between the cylindrical filter cartridges and straddle the dessicant bed. The inner cylindrical cartridge has a selected lower porosity than the porosity of the lower filter pad. The inner cylindrical filter cartridge and the coaxially disposed discharge portion of the J-tube form an annular discharge channel which is connected to the discharge plenum chamber by a relatively wide opening in the upper filter retainer.

The accumulator/filter-drier of this invention functions as an integrally effective device because: (1) the filter-drier assembly is designed to transform turbulent flow of the vapor-liquid mixture moving radially inwardly from the inlet plenum chamber into laminar flow within the outer cylindrical filter and the dessicant bed, whereby separation of liquid from vapor readily occurs; (2) the device is designed to be installed in upright position, so that the separated liquid moves by gravity toward the bottom filter pad; and (3) the pressure relationships established by the relative porosities of the inner cylindrical cartridge and the lower filter pad cause a minor portion of the vapor within the dessicant bed also to flow downwardly toward and through the lower filter pad.

The lower filter pad has a very high porosity and rests upon a perforated retainer plate, preferably having a plurality of radially disposed louvers therein. Liquid and vapor therefore fall and flow readily into the accumulator chamber, which is beneath the filter-drier, while the major portion of the vapor flows through the inner cylindrical filter cartridge into the annular vapor discharge channel and then into the discharge plenum chamber. The outlet of the J-tube is situated immediately below and coaxially aligned with the outlet from the discharge plenum chamber so that venturi activity, as is known in the art, assists in its pickup characteristics.

The cylindrical filter cartridges are preferably made of resin-bonded wool, as a felt with such small void openings that they are capable of retaining particles larger than 10 microns. The outer cartridge functions as the principal filter and gradually acquires a filter coat of deposited materials, but because of its large and uniformly accessible surface area, it creates a low pressure drop for an extended period of use.

The annular filter pads are primarily formed from resin-bonded fiberglass and have a very high porosity so that liquid, which can rather rapidly vary from up to about 90% refrigerant to up to about 90% oil, drops easily therethrough and can not build up to form a pool within the dessicant bed. The liquid contains some of the water which is dissolved therein, but the partial pressure of this water is in equilibrium with the partial pressure of the water vapor that is mixed with the vaporized refrigerant.

Most of the solids that are carried through the lines tend to travel with the liquid phase, probably because of the washing effect created by slugs of liquid. Thus the solids in the fast-moving stream of liquid and vapor entering the plenum chamber are carried into all portions of the outer filter cartridge and are trapped there, while the turbulent flow changes to laminar so that the vapor flows radially inwardly and the liquid coats the dessicant particles, while only slightly filling the void spaces therebetween, and flows rapidly, as a thin film covering the particles, down the dessicant bed, and then through the bottom filter pad into the plenum chamber of the accumulator.

The primary purpose of the inner filter cartridge is to retain the dessicant and particularly any small dessicant particles that have been formed by attrition. These particles are principally created before installation of the accumulator/filter-drier so that the porosity of the inner cartridge remains essentially constant and retains the original porosity relationship to the porosity of the bottom filter pad during the entire life of the device.

The inlet line entering the inlet plenum chamber may be obliquely and tangentially disposed to the sides of the shell or may be aligned longitudinally therewith. Tangential alignment is generally preferred, but longitudinal alignment is entirely satisfactory because of: (1) the size of the inlet plenum chamber and (2) the ready accessibility of the entire outer filter cartridge to inward movement of liquid and vapor. At the bottom of the inlet plenum chamber and indeed surrounding the entire outer filter cartridge is a sump which provides a place for depositing heavy particles such as fragments of metal turnings, solder, and brazing materials.

As is known in the art, the dessicant bed may be a molecular sieve (such as zeolite A) for adsorbing water, oxygen, and carbon dioxide, alumina, activated carbon, and/or any mixture thereof for additionally adsorbing gums and other oil breakdown products.

The outer shell of the device is formed in three parts: (1) a circular bottom closure member, (2) a cylindrical shell fitting within the bottom closure member, and (3) a top closure member having a circular sealing lip permitting its fitting over the cylindrical shell while providing a space therewithin for the outer lip of the bottom fitler retainer to rest upon the rim of the shell. A compression assembly, comprising a helical spring, a spring cap, and a push nut, biasses the pickup tube upwardly against the bottom filter retainer in order to: (1) seal the opening therebetween; (2) support the pickup tube so that it does not touch the bottom closure member; and (3) seat the pickup tube near its outlet end against the bottom filter retainer so that the pickup tube cannot vibrate, rotate, or contact the cylindrical shell.

The top filter retainer is slidably seated along its circular edge against the interior of the top closure member, thereby separating the inlet plenum chamber from the discharge plenum chamber, but the entire interior of the device essentially rests on the outer lip of the bottom filter retainer, being merely stabilized by engagement with the circular edge of the top filter retainer and being suspended within the enclosing shell without any further contact therewith or opportunity to rattle or be dislodged in any manner.

BRIEF DESCRIPTION OF THE DRAWINGS

The invention may be more clearly understood by referring to the drawings which are as follows.

BRIEF DESCRIPTION OF THE PREFERRED EMBODIMENTS

Figure 1:
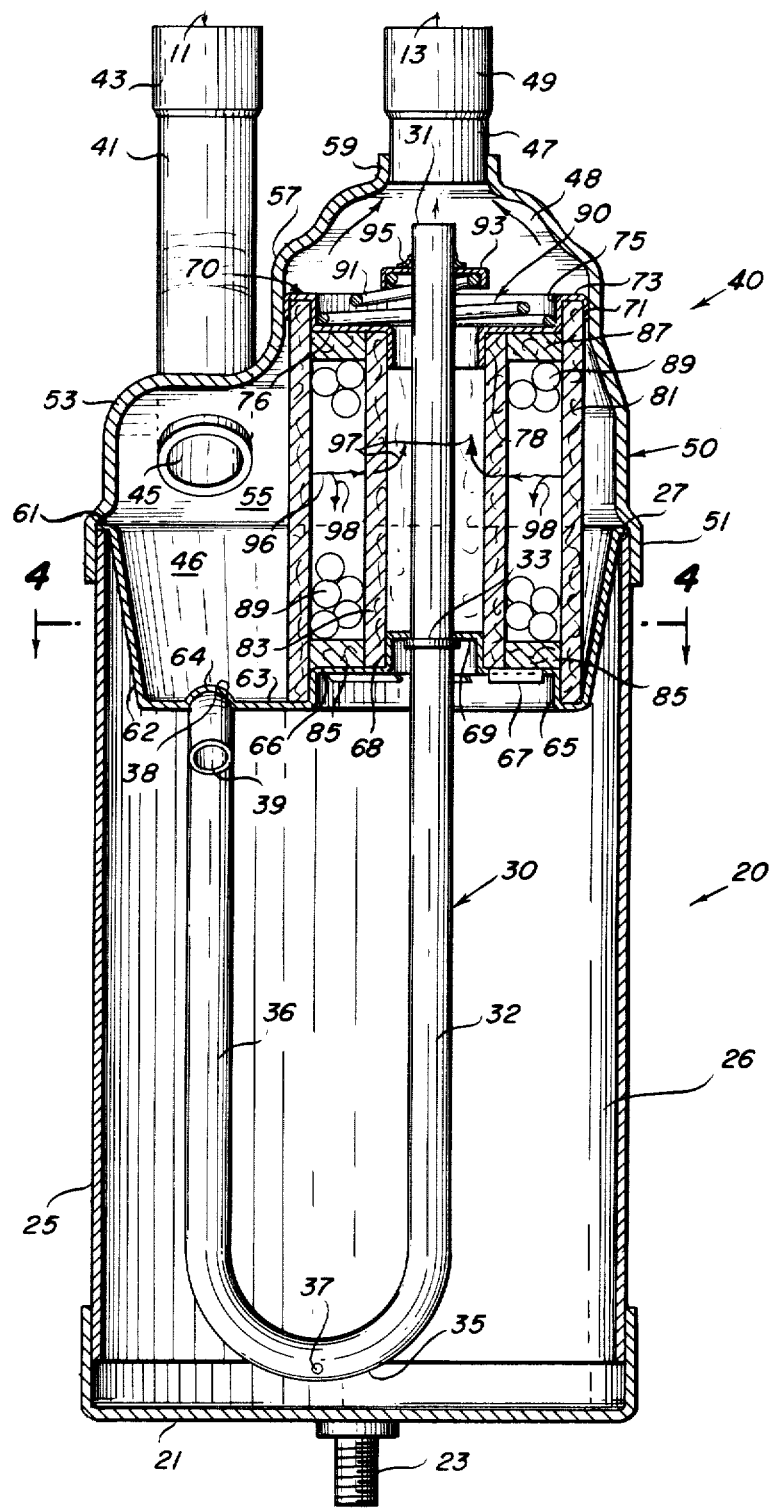
FIG. 1 is a sectional elevation through the accumulator/filter-drier of this invention which shows the tangential-entry embodiment for the inlet time.

Referring to the drawings, the accumulator/filter-drier 10 of this invention comprises an accumulator portion 20 and a filter-drier portion 40. Analyzed structurally, the enclosing shell comprises a bottom closure member 21, a cylindrical shell 25 which fits within bottom closure member 21 and is sealably attached thereto, and a top closure member 50 or 50' which is sealably attached to the cylindrical shell 25.

Top closure members 50, 50' comprise a circular sealing lip 51, a coaxial inlet shoulder 53, an off-centered but circular filter shoulder 57, and an outlet rim 59 which is coaxially disposed to shoulder 57. The tangential-entry embodiment comprises top closure member 50, and the vertical-entry embodiment includes top closure member 50', the embodiments being alike in all other respects. Members 50, 50' differ in that member 50 includes an inlet recess 55 which is obliquely disposed to the longitudinal axis of the accumulator/filter-drier, but member 50' has no such recess, its inlet perimeter 54 being disposed transversely thereto. Recess 55 and perimeter 54 are located between shoulders 53, 57. Sealing lip 51 overlaps shell 25 and provides an inner shoulder for supporting top closures 50, 50' thereupon. Sealing lip 51 is sealably attached to shell 25, as by brazing or welding.

Figure 2:
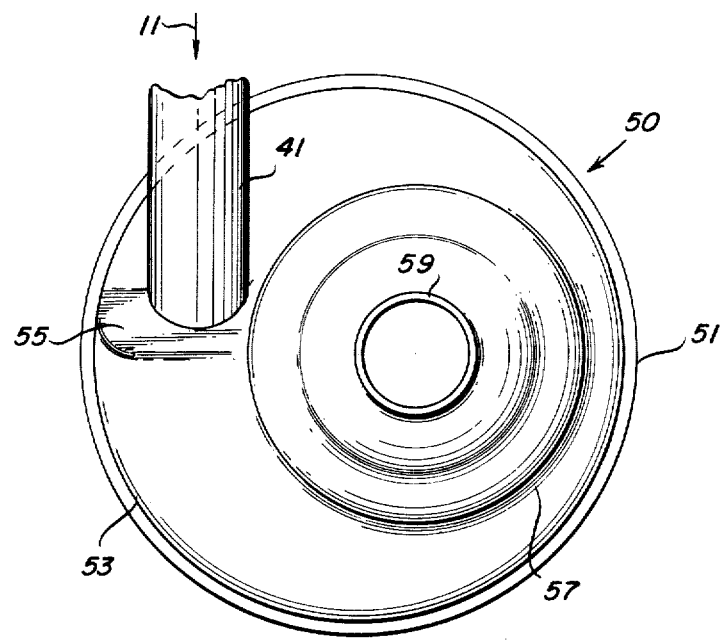
FIG. 2 is a top view of the tangential-entry embodiment shown is FIG. 1.
Figure 3:
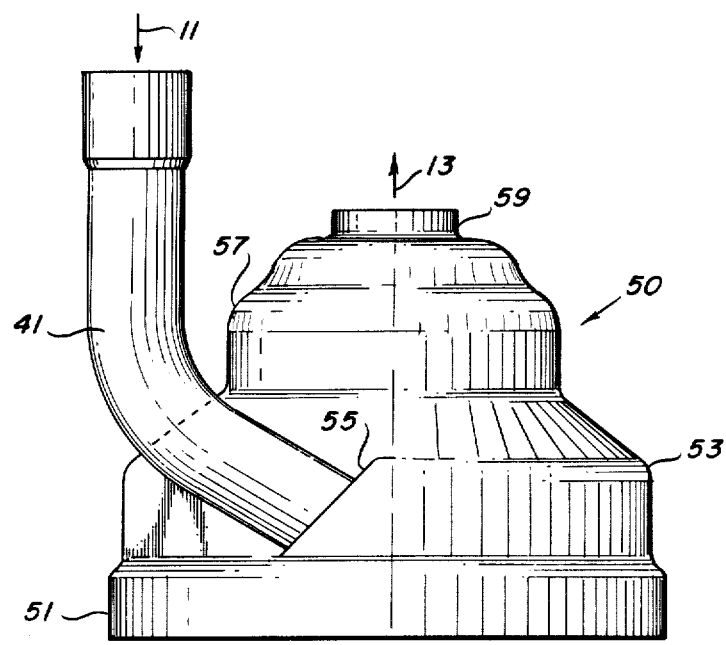
FIG. 3 is a side view of the top closure member shown in FIGS. 1 and 2.
Figure 4:
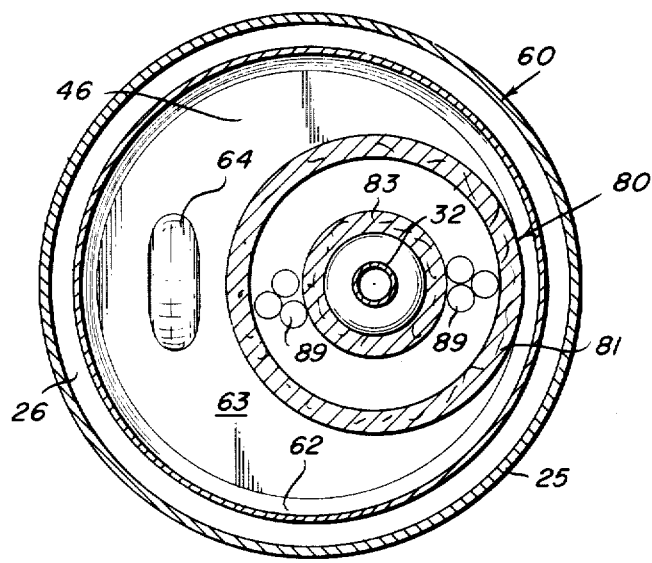
FIG. 4 is a sectional plan view looking in the direction of the arrows crossing the line 4—4 in FIG. 1.
Figure 6:
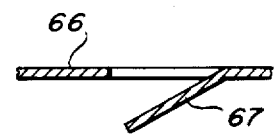
FIG. 6 is a sectional view through one of the louvers of the bottom filter retainer, looking in the direction of the arrows crossing line 6—6 in FIG. 5.
Figure 7:
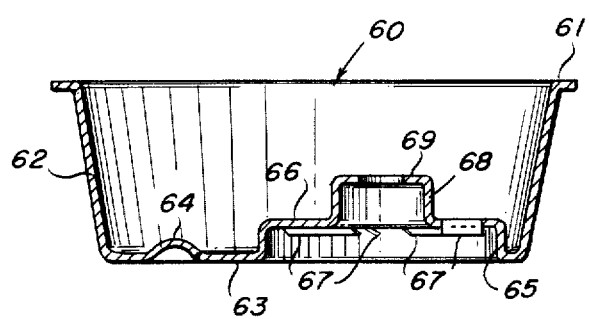
FIG. 7 is a sectional elevation of the bottom filter retainer, looking in the direction of the arrows crossing the line 7—7 in FIG. 5.
Figure 8:
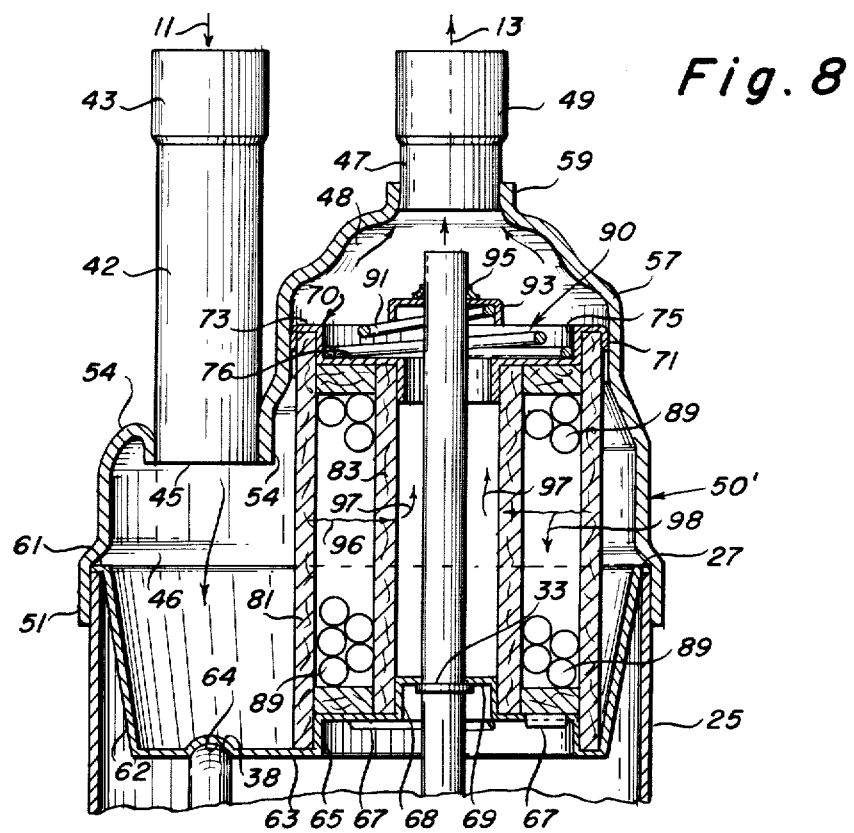
FIG. 8 is a sectional elevation of the top portion of the vertical-entry embodiment for the inlet of the accumulator/filter-drier of this invention.
Figure 9:
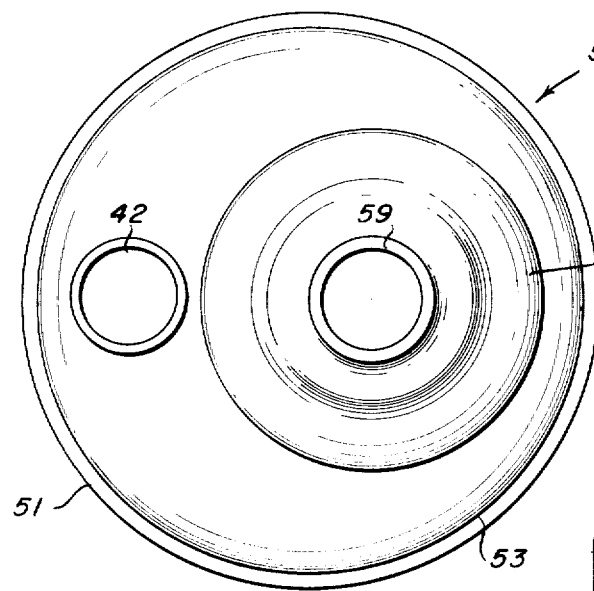
FIG. 9 is a top view, similar to FIG. 2, of the vertical-entry embodiment shown in FIG. 8.
Figure 10:
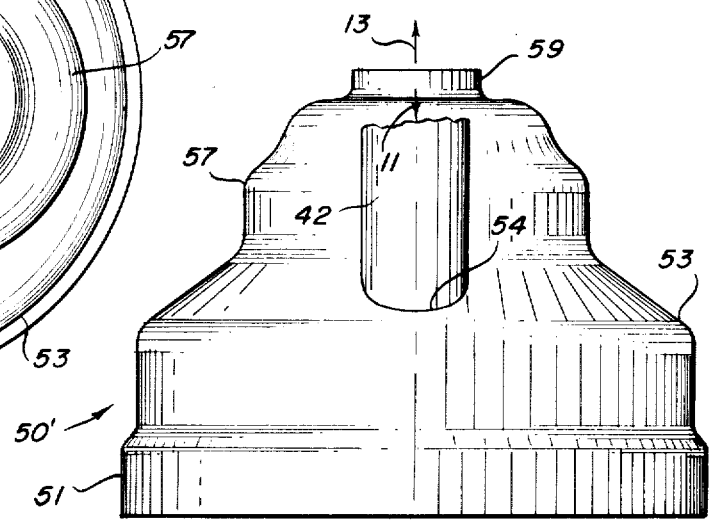
FIG. 10 is a side view, similar to FIG. 3, of the vertical-entry embodiment shown in FIGS. 8 and 9.

Referring to FIGS. 1-7 for the tangential-entry embodiment, an inlet tube 41 is obliquely disposed, as particularly seen in FIG. 3, and is sealably attached to the perimeter of an opening in recess 55. Referring to FIGS. 8-10 for the vertical-entry embodiment, inlet tube 42 is vertically disposed and is sealably attached to perimeter 54 of an opening in the sloping surface between shoulders 53, 57. In both embodiments, tubes 41, 42 are connected to suction line 43 from the evaporator, which is not shown in the drawings, and an outlet tube 47 is sealably attached to outlet rim 59 and to suction line 49 to the compressor, which is also not shown in the drawings.

Analyzed functionally, the integral suction line accumulator/filter-drier comprises an accumulator portion 20 and a filter-drier portion 40. Accumulator portion 20 comprises bottom closure member 21, cylindrical shell 25, accumulator plenum chamber 26 within shell 25, and pickup tube 30 which comprises outlet 31, vertical discharge portion 32, stop ring 33, bottom bend 35, orifice 37, inlet bend 38, and inlet 39. The accumulator/filter-drier is always uprightly disposed and is held in position by a mounting stud 23 which is attached to the bottom of bottom closure member 21. Filter-drier portion 40 comprises top closure member 50 or 50', bottom filter retainer 60, top filter retainer 70, filter-drier assembly 80, and compression assembly 90.

Figure 5:
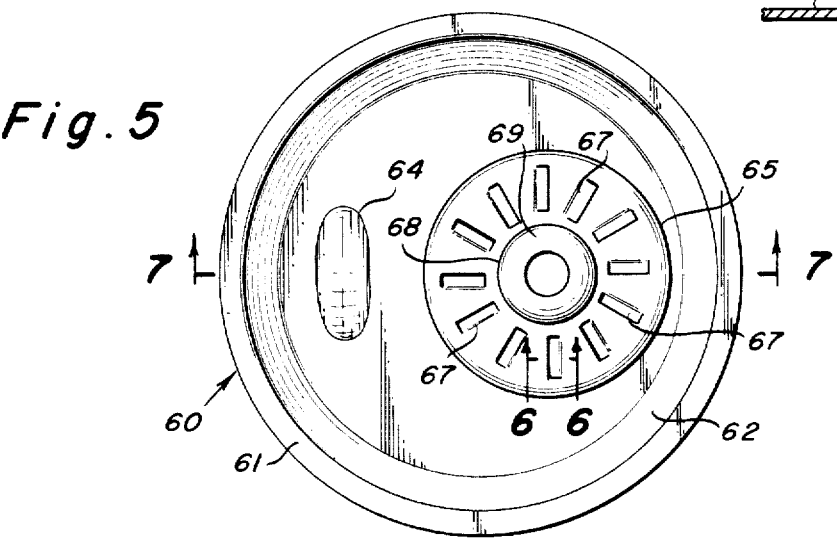
FIG. 5 is a top plan view of the bottom filter retainer.

Bottom filter retainer 60 comprises outer lip 61 which rests upon rim 27 of cylindrical shell 25, inclined wall 62, off-centeredly shaped sump plate 63, tube recess 64 in sump plate 63, outer filter wall 65, louvered retainer plate 66, inner filter wall 68, and stop plate 69. Louvers 67, as clearly seen in FIGS. 5–7, are radially disposed as perforating means for louvered retainer plate 66. Filter walls 65 and 68 are circular and coaxially disposed to the opening in stop plate 69.

Top filter retainer 70 comprises circular edge 71, outer filter plate 73, outer filter wall 75, retaining plate 76, and inner filter wall 78. The opening formed by inner filter wall 78 is appreciably larger than the opening formed in stop plate 69 but is coaxially aligned therewith. Circular edge 71 fits slidably within the cylindrical portion beneath shoulder 57 of members 50, 50'.

Filter-drier assembly 80 comprises cylindrical outer filter cartridge 81, cylindrical inner filter cartridge 83, annular bottom fiber pad 85, annular top fiber pad 87, and annular dessicant bed 89. Cartridges 81, 83 radially straddle dessicant bed 89, and fiber pads 85, 87 longitudinally straddle dessicant bed 89 at its bottom and top, respectively. The porosity of inner filter cartridge 83 is selectively less than the porosity of bottom fiber pad 85, whereby a selected minor portion of the vapor, in addition to substantially all of the liquid, passes through bottom fiber pad 85 and through louvers 67 into accumulator plenum chamber 26.

Compression assembly 90 comprises helical retaining spring 91, spring cap 93, and push nut 95. Helical spring 91 rests upon retaining plate 76 and is compressed by spring cap 93 which is compressibly positioned by push nut 95.

The top of inlet bend 38 of pickup tube 30 fits within tube recess 64 in sump plate 63 so that, in co-operation with engagement of stop ring 33 against the bottom of stop plate 69, pickup tube 30: (1) is not free to rotate within plenum chamber 26 and is held snugly to resist vibration by being biasedly attached at two positions to bottom filter retainer 60; (2) is supported out of contact with shell 25 and bottom closure 21; and (3) seals accumulator plenum chamber 26 from the annular discharge opening formed between vertical discharge portion 32 of pickup tube 30 and inner cartridge 81.

As a part of filter-drier portion 40, an inlet plenum chamber 46 is formed between bottom filter retainer 60 and top filter retainer 70 in combination with top closure members 50, 50', and a discharge plenum chamber 48 is formed between top filter retainer 70 and closure members 50, 50'. In-flowing fluid 11 entering through suction line 43 enters plenum chamber 46 of the tangential-entry embodiment that is shown in FIGS. 1–3 and swirls around outer cartridge 81 so that heavy metal particles tend to be thrown away from cartridge 81 and eventually fall into the sump above sump plate 63 where a thin layer of liquid is generally retained. Liquid and vapor then flow radially inwardly through outer cartridge 81 as flow 96, rapidly changing from turbulent to laminar flow and thereby enabling liquid 98 to move downwardly through dessicant bed 89 and then through bottom filter pad 85 and the louvered openings in plate 66 into plenum chamber 26. All of the liquid and a minor portion of the vapor follow this downward path while the major portion of the vapor moves as flow 97 through the annular discharge opening formed by inner cartridge 83 and discharge portion 32 of pickup tube 30 into discharge plenum chamber 48 and thence through outlet tube 47 and suction line 49 to the compressor.

Referring to FIGS. 8–10 which show the vertical-entry embodiment of the accumulator/filter-drier of this invention, all portions thereof and all details are as described for FIGS. 1–7 except that inlet tube 42 is vertically disposed and longitudinally aligned with shell 25, being sealably attached to raised perimeter 44 in top closure member 50' between shoulders 53, 57 and above inlet plenum chamber 46. In-flowing liquid 11 thus impinges directly upon the top of the tube recess 64 and flows equally in both directions around outer cartridge 81 to meet within the narrow space on the opposite side while moving inwardly and radially through all portions of cartridge 81. In all other respects, the vertical-entry embodiment is exactly the same as the tangential-entry embodiment and operates in exactly the same manner.

Filter cartridges 81, 83 are suitably made of wool felt impregnated with a resin but may also be made of fiberglass or other suitable filter material known in the art and having a sufficiently high porosity as compared to the porosity of inner filter cartridge 83. Both filter pads 85, 87 are preferably made of resin bonded fiberglass. All other components can be made of steel, stainless stell, Monel metal, or any other materials which have suitable strength and refrigerant compatability characteristics.

Because it will be readily apparent to those skilled in the art that innumerable variations, modifications, applications, and extensions of the examples and principles hereinbefore set forth can be made without departing from the spirit and the scope of this invention, what is herein defined as such scope and is desired to be protected should be measured, and the invention should be limited, only by the following claims.

What is claimed is:

1. A low-pressure accumulator/filter-drier for installation in upright position in an air conditioning system between the evaporator and compressor thereof, which comprises, in sealed combination:
  A. a filter-drier, comprising an inlet plenum chamber, a discharge plenum chamber, and a filter-drier assembly which is surrounded by said inlet plenum chamber and which comprises:
     (1) an inner cylindrical filter cartridge,
     (2) an outer cylindrical filter cartridge, and
     (3) an annular dessicant bed which is disposed between said cartridges; and
  B. an accumulator, comprising:
     (1) an accumulator plenum chamber, for accumulating liquid and receiving vapor, which is disposed beneath said filter-drier, and
     (2) a pickup tube having a discharge portion which is coaxially aligned with said filter-drier assembly and is radially spaced from said inner filter cartridge to form therebetween an annular vapor discharge channel which is connected to said discharge plenum chamber.

2. The accumulator/filter-drier of claim 1, wherein an inlet from said evaporator is connected to said inlet plenum chamber and an outlet to said compressor is connected to said discharge plenum chamber and in coaxial flow relationship to the outlet of said pickup tube.

3. The accumulator/filter-drier of claim 2, wherein said inlet is obliquely disposed to the longitudinal axis of said accumulator/filter-drier.

4. The accumulator/filter-drier of claim 2, wherein said inlet is disposed in parallel to the axis of said accumulator/filter-drier.

5. The accumulator/filter-drier of claim 3 or 4, wherein said filter-drier comprises a bottom filter retainer which is the top closure member for said accumulator plenum chamber and is the bottom closure member for said filter-drier.

6. The accumulator/filter-drier of claim 5, wherein a portion of said bottom filter retainer is a bottom positioning means for said filter assembly.

7. The accumulator/filter-drier of claim 6, wherein said bottom positioning means comprises a hole which is off-centered with respect to said accumulator and is consecutively surrounded by a circular and radially disposed stop plate, a circular and longitudinally disposed inner filter wall, a circular and radially disposed louvered retainer plate, a circular and longitudinally disposed outer filter wall, an irregularly shaped and radially disposed sump plate, a circular and inclined outer wall, and a circular and radially disposed outer lip.

8. The accumulator/filter-drier of claim 7, wherein a pair of annular filter pads is disposed at the top and at the bottom of said annular dessicant bed in straddling relationship thereto and in abutting relationship to the dessicant-facing sides of both said filter cartridges.

9. The accumulator/filter-drier of claim 8, wherein said annular filter pad at the bottom of said dessicant bed rests upon said louvered retainer plate.

10. The accumulator/filter-drier of claim 9, wherein said louvered retainer plate is freely perforated.

11. The accumulator/filter-drier of claim 10, wherein said louvered retainer plate is perforated by a plurality of radially disposed louvers.

12. The accumulator/filter-drier of claim 10, wherein said filter cartridges and said dessicant bed have characteristics that convert flow therethrough from turbulent to laminar.

13. The accumulator/filter-drier of claim 12, wherein the porosity of said inner filter cartridge is less than the porosity of said bottom filter pad.

14. The accumulator/filter-drier of claim 13, wherein the ratio of said porosities causes up to 85% of flow through said inlet to pass through both said filter cartridges during normal steady-state operation of said air conditioning system and at least 15% of said flow to pass through said bottom filter pad and said louvered retainer plate.

15. The accumulator/filter-drier of claim 14, wherein said discharge portion of said pickup tube is provided with a stop ring against which said stop plate rests.

16. The accumulator/filter-drier of claim 15, wherein said pickup tube has an outlet, a vertically disposed discharge portion, a bottom bend, a vertically disposed intake portion, a top bend, and an inlet.

17. The accumulator/filter-drier of claim 16, wherein said retainer plate comprises a depression in said sump plate into which said top bend seats when said stop ring and said stop plate are held in sealing engagement by a biasing means.

18. The accumulator/filter-drier of claim 17, wherein said filter-drier assembly comprises a top filter retainer which sealably separates said inlet plenum chamber from said discharge plenum chamber.

19. The accumulator/filter-drier of claim 18, wherein said top filter retainer is a top positioning means for said filter-drier assembly.

20. The accumulator/filter-drier of claim 19, wherein said top positioning means consecutively comprises a circular and longitudinally disposed filter wall, which is longitudinally aligned with said circular inner filter wall, a circular and radially disposed outer filter plate, and a circular edge which is seated against said top closure.

21. The accumulator/filter-drier of claim 20, wherein said outer cylindrical filter cartridge is seated against said outer filter plate, both said outer filter walls, and said sump plate.

22. The accumulator/filter-drier of claim 21, wherein said inner cylindrical filter is seated against said retaining plate, both said inner filter walls, and said louvered retainer plate.

23. The accumulator/filter-drier of claim 22, wherein said annular filter pad at the top of said dessicant bed is seated against said retaining plate.

24. The accumulator/filter-drier of claim 19, wherein said biasing means comprises a helical spring which is disposed between said top filter retainer and a spring cap which is compressibly attached to said vertical discharge portion of said pickup tube.

25. In an air conditioning system having an evaporator and a compressor, an improved accumulator/filter-drier which is installed in upright position therebetween on the suction side of said compressor, comprising in sealed combination within an enclosing shell:

A. a filter-drier which comprises:
 (1) a first retainer means for sealably separating said filter-drier from an accumulator disposed therebeneath,
 (2) a second retainer means for separating the inlet of said filter-drier from the outlet thereof, said inlet being connected to said evaporator for receiving liquid and vapor and said outlet being connected to said compressor, and
 (3) a filtering and drying means for:
  (a) drying said liquid and said vapor,
  (b) separating said liquid from said vapor,
  (c) directing substantially all of said liquid and a minor portion of said vapor to said accumulator through at least one opening in said first retainer means, and
  (d) directing the remainder of said vapor to said outlet through an opening in said second retainer means; and B. said accumulator, having:
 (1) a storage means for storing said liquid received from said filtering and drying means, and
 (2) a pickup means for venting said minor portion of said vapor from said storage means, for picking up said liquid with said minor portion of said vapor, and for discharging said minor portion of said vapor and said liquid to said outlet.

26. The improved accumulator/filter-drier of claim 25, wherein said inlet is obliquely disposed to the longitudinal axis of said accumulator/filter-drier.

27. The improved accumulator/filter-drier of claim 25, wherein said inlet is disposed in parallel to the axis of said accumulator/filter-drier.

28. The improved accumulator/filter-drier of claim 26 or 27, wherein:
A. an inlet plenum chamber is formed within said enclosing shell between said first retainer means and said second retainer means;
B. a discharge plenum chamber is formed within said enclosing shell between said second retainer means and said outlet; and
C. said filtering and drying means is disposed within said inlet plenum chamber and in sealed flow connection with said discharge plenum chamber.

29. The improved accumulator/filter-drier of claim 28, wherein said filtering and drying means comprises a central discharge opening.

30. The improved accumulator/filter-drier of claim 29, wherein said accumulator comprises a pickup tube which is J-shaped as a short inlet portion, a bottom bend, and a long discharge portion, said inlet portion being biased against said first retainer means, said bottom bend having a liquid pickup orifice, and said discharge portion being coaxially aligned with said central discharge opening and sealably connected to said first retainer means.

31. The improved accumulator/filter-drier of claim 30, wherein said filtering and drying means comprises a porosity differential means for directing said minor portion of said vapor to said accumulator.

32. The improved accumulator/filter-drier of claim 31, wherein said filtering and drying means comprises a pair of filter cartridges straddling a dessicant bed which rests upon a filter pad disposed above said at least one opening in said first retainer means.

33. The improved accumulator/filter-drier of claim 31, wherein said filter cartridges and said dessicant bed are cylindrical and, as said porosity differential means, the inner of said pair of filter cartridges has a selected porosity that is less than the porosity of said filter pad.

34. The improved accumulator/filter-drier of claim 33, wherein the outer of said filter cartridges converts flow of said liquid and vapor from turbulent to laminar and enables said separating of said liquid from said vapor to take place by gravity.

* * * * *